US009457377B2

(12) United States Patent
Nakano et al.

(10) Patent No.: US 9,457,377 B2
(45) Date of Patent: Oct. 4, 2016

(54) HYDROPHILIC MEMBER AND HYDROPHILIC PRODUCT USING THE SAME

(71) Applicants: KABUSHIKI KAISHA TOSHIBA, Tokyo (JP); TOSHIBA MATERIALS CO., LTD., Yokohama-shi, Kanagawa (JP)

(72) Inventors: Kayo Nakano, Yokohama (JP); Akira Sato, Yokohama (JP); Yasuhiro Shirakawa, Yokohama (JP); Keiichi Fuse, Yokohama (JP); Shinya Kasamatsu, Yokohama (JP); Akito Sasaki, Yokohama (JP)

(73) Assignees: KABUSHIKI KAISHA TOSHIBA, Tokyo (JP); TOSHIBA MATERIALS CO., LTD., Yokohama-Shi (JP)

( * ) Notice: Subject to any disclaimer, the term of this patent is extended or adjusted under 35 U.S.C. 154(b) by 122 days.

(21) Appl. No.: 14/337,754

(22) Filed: Jul. 22, 2014

(65) Prior Publication Data
US 2014/0329029 A1 Nov. 6, 2014

Related U.S. Application Data

(63) Continuation of application No. 12/874,880, filed on Sep. 2, 2010, now abandoned, which is a continuation of application No. PCT/JP2009/000986, filed on Mar. 4, 2009.

(30) Foreign Application Priority Data

Mar. 4, 2008 (JP) ................ P2008-054138
Mar. 4, 2008 (JP) ................ P2008-054140

(51) Int. Cl.
| | |
|---|---|
| B05D 5/00 | (2006.01) |
| B01J 23/30 | (2006.01) |
| B01J 23/34 | (2006.01) |
| B01J 23/652 | (2006.01) |
| B01J 23/68 | (2006.01) |
| B01J 23/888 | (2006.01) |
| B01J 37/02 | (2006.01) |
| B82Y 30/00 | (2011.01) |
| C01G 41/00 | (2006.01) |
| C01G 41/02 | (2006.01) |
| C03C 17/00 | (2006.01) |
| C09D 5/16 | (2006.01) |
| C09D 7/00 | (2006.01) |
| C09D 7/12 | (2006.01) |
| B01J 35/00 | (2006.01) |
| B01J 35/10 | (2006.01) |
| C08K 3/22 | (2006.01) |
| C08K 5/05 | (2006.01) |
| C08K 5/10 | (2006.01) |

(52) U.S. Cl.
CPC ............. *B05D 5/00* (2013.01); *B01J 23/30* (2013.01); *B01J 23/34* (2013.01); *B01J 23/6527* (2013.01); *B01J 23/687* (2013.01); *B01J 23/888* (2013.01); *B01J 35/004* (2013.01); *B01J 37/0215* (2013.01); *B82Y 30/00* (2013.01); *C01G 41/00* (2013.01); *C01G 41/02* (2013.01); *C03C 17/008* (2013.01); *C09D 5/1618* (2013.01); *C09D 7/001* (2013.01); *C09D 7/1216* (2013.01); *C09D 7/1266* (2013.01); *C09D 7/1275* (2013.01); *B01J 35/0013* (2013.01); *B01J 35/10* (2013.01); *C01P 2004/62* (2013.01); *C01P 2004/64* (2013.01); *C01P 2006/12* (2013.01); *C03C 2217/445* (2013.01); *C03C 2217/475* (2013.01); *C03C 2217/75* (2013.01); *C03C 2217/77* (2013.01); *C08K 3/22* (2013.01); *C08K 5/05* (2013.01); *C08K 5/10* (2013.01); *Y10T 428/24413* (2015.01)

(58) Field of Classification Search
CPC ....................................................... B05D 5/00
See application file for complete search history.

(56) References Cited

U.S. PATENT DOCUMENTS

| | | | |
|---|---|---|---|
| 6,090,489 A | 7/2000 | Hayakawa et al. | |
| 6,379,776 B1* | 4/2002 | Tada ................... | C03C 17/3417 428/149 |
| 6,465,088 B1* | 10/2002 | Talpaert ................. | B01J 35/002 428/304.4 |
| 2005/0025700 A1* | 2/2005 | Bulian ................... | B82Y 30/00 423/606 |
| 2005/0214509 A1 | 9/2005 | Ichiyanagi et al. | |
| 2006/0058490 A1* | 3/2006 | Kang ................... | C09D 183/04 528/40 |
| 2006/0205304 A1* | 9/2006 | Marzolin ........... | B01D 53/8668 442/180 |

(Continued)

FOREIGN PATENT DOCUMENTS

| | | |
|---|---|---|
| GB | 2 361 246 A | 10/2001 |
| JP | 10-140046 A | 5/1998 |

(Continued)

OTHER PUBLICATIONS

Gleiter "Nanocrystalline Materials" Process in Materials Science vol. 33. pp. 223-315 1989.*

(Continued)

*Primary Examiner* — Nathan Empie
(74) *Attorney, Agent, or Firm* — Foley & Lardner LLP

(57) ABSTRACT

In one embodiment, a hydrophilic member includes a substrate having a surface and particles existing at least on the surface of the substrate. The particles are constituted of at least one selected from tungsten oxide particles and tungsten oxide composite particles. The substrate surface on which the particles exist has an arithmetic mean roughness Ra in the range of 1 nm to 1000 nm with a reference length of 100 μm, and exhibits hydrophilicity independently of light.

20 Claims, No Drawings

(56) References Cited

U.S. PATENT DOCUMENTS

| | | |
|---|---|---|
| 2007/0177372 A1 | 8/2007 | Matsuda et al. |
| 2008/0006954 A1 | 1/2008 | Yubuta et al. |
| 2009/0023583 A1 | 1/2009 | Nakano et al. |
| 2010/0204041 A1 | 8/2010 | Nakano et al. |
| 2010/0291295 A1 | 11/2010 | Ichiyanagi et al. |

FOREIGN PATENT DOCUMENTS

| | | |
|---|---|---|
| JP | 2000-119551 A | 4/2000 |
| JP | 2000-135755 A | 5/2000 |
| JP | 2000-226234 A | 8/2000 |
| JP | 2001-152130 A | 6/2001 |
| JP | 2002-234105 A | 8/2002 |
| JP | 2002-293544 A | 10/2002 |
| JP | 2003-225573 A | 8/2003 |
| JP | 2004-002104 A | 1/2004 |
| JP | 2006-102737 A | 4/2006 |
| JP | 2006-205531 A | 8/2006 |
| JP | 2008-006429 A | 1/2008 |
| WO | WO 2009/031316 A1 | 3/2009 |

OTHER PUBLICATIONS

Su et al "A Modified Plasma Arc Gas Condensation Technique to Synthesize Nanocrystalline Tungsten Oxide Powders" Materials Transactions, V 43, No. 5 (2005) pp. 1016-1020.*

JIS B 0601, "Geometrical Product Specifications (GPS)—Surface Texture: Profile method-Terms, definitions and surface texture parameters", Jaqpanese Industrial Standard, 2001.

Translation of International Preliminary Report on Patentability of PCT/JP2009/000986, dated Oct. 21, 2010, 8 pages.

R. Azimirad et al., "Hydrophilicity variation of $WO_3$ thin films with annealing temperature ", Journal of Physics D. Applied Physics, Institute of Physics Publishing, Vol. 40, (2007), pp. 1134-1137.

English Translation of JP 2006-205531.

\* cited by examiner

HYDROPHILIC MEMBER AND HYDROPHILIC PRODUCT USING THE SAME

CROSS-REFERENCE TO RELATED APPLICATION

This application is a continuation of U.S. application Ser. No. 12/874,880, filed Sep. 2, 2010, which is a continuation of prior International Application No. PCT/JP2009/000986, filed on Mar. 4, 2009 which is based upon and claims the benefit of priority from Japanese Patent Application No. 2008-054138, filed on Mar. 4, 2008 and No. 2008-054140, filed on Mar. 4, 2008; the entire contents of all of which are incorporated herein by reference.

FIELD

Embodiments described herein relate generally to a hydrophilic member and a hydrophilic product using the same.

BACKGROUND

A member with a surface to which hydrophilicity is added is used in various areas such as anti-fogging, dew condensation prevention, stain-proofing, printing of a water based coating, and the like. Recently, a hydrophilic member (member with a surface to which hydrophilicity is added) using a titanium oxide based photocatalyst film is developed and applied to an exterior wall, a window glass, a rearview mirror of an automobile, and the like. A titanium oxide film changes in surface state when it is irradiated with ultraviolet rays included in the sunlight and becomes hydrophilic, and simultaneously an organic matter adhering to the surface is oxidized and decomposed by photocatalysis, thereby exhibiting high hydrophilicity. On a building material or a window glass to which the titanium oxide based photocatalyst film is applied, stain adhering to its surface is washed away by rains, thereby obtaining a stain-proofing effect.

When the member which becomes hydrophilic by light is actually applied, a state that there is no irradiation with light becomes a problem. The titanium oxide film decreases in hydrophilicity in a relatively short time, and thus when it is applied to, for example, an anti-fogging agent for a rear view mirror of an automobile, the anti-fogging effect is insufficient during night or in a state of being stored in a garage. In some of such members, it is devised to elongate the duration of the hydrophilicity by mixing a silicon dioxide, which is a hydrophilic oxide, or the like with the titanium oxide, but sufficient performance has not obtained. Moreover, ultraviolet rays are necessary as excitation light, and thus excitation light may become insufficient in the shade or indoors. For supplementing insufficient excitation light, nitrogen or sulfur is added to the titanium oxide, or carrying by platinum is performed. However, the wavelength range of available light does not enlarge so much, and performance applicable to indoor use has not been obtained. The duration of hydrophilic effect is similar to that of conventional titanium oxide, and the hydrophilicity decreases in a short period in a dark place.

Tungsten oxide is widely used as a dielectric material for electronic devices, an optical element material, an electrochromic material, and a gas sensor material, and is further known as a visible light responsive photocatalyst material. The band gap of the tungsten oxide is 2.5 eV, and visible light in the vicinity of 450 nm can be used as excitation light, whereas ultraviolet rays of only 380 nm or lower can be used for the titanium oxide. Accordingly, the tungsten oxide can be used as a photocatalyst by the wavelength range of light from a fluorescent lamp or light bulb. The tungsten oxide is also known to exhibit hydrophilicity by light irradiation, and mainly there are reported films produced by a vacuum deposition method, a sputtering method, a laser ablation method, a sol gel method, and the like.

JP-A 2001-152130 (KOKAI) describes a photocatalyst material obtained by sputter-depositing tungsten oxide on a substrate, where tungsten oxide having a triclinic crystal structure is mainly used. JP-A 2001-152130 (KOKAI) discloses obtainment of hydrophilicity by exciting a tungsten oxide film with visible light. Specifically, it describes that a contact angle (initial value) of a sputter-deposited tungsten oxide film with water is in the range of 10° to 30°, and the contact angle with water becomes 5° or less when the tungsten oxide film is irradiated with ultraviolet rays and about 20 minutes elapse thereafter. J. Phys. D: Appl. Phys. 40 (2007) 1134 discloses that a tungsten oxide film which is formed by a thermal deposition method or sol-gel method and heat treated thereafter at 400° C. exhibits hydrophilicity.

A conventional tungsten oxide film exhibits hydrophilicity upon excitation by light, and performance in a state that light is insufficient becomes a problem. When hydrophilicity is made by applying heating, heat resistance of the substrate becomes a problem, and for a member with a large area, the method of heating also becomes a problem. Further, when hydrophilicity is made in post-processing such as light irradiation or heating, its duration is short and regular light irradiation or heating becomes necessary in a short period. Moreover, it is not possible to remove organic matters by only the hydrophilicity, and thus when an organic matter such as an oil component adheres to the surface, it must be removed by sufficient rainwater, water washing, or the like. This poses a problem of limitation on use environment. Accordingly, the performance to oxidize and decompose organic matters on the surface by photocatalysis is also needed, but sufficient photocatalytic performance has not been obtained with conventional tungsten oxide films.

In order to form a uniform film using a tungsten oxide powder, a fine powder is needed. As a method of producing the tungsten oxide powder, there is known a method (see JP-A2002-293544 (KOKAI)) to heat an ammonium paratungstate (APT) in the air to obtain a tungsten trioxide powder. By the method to heat the APT in the air, the tungsten trioxide powder with a primary particle diameter of 0.01 μm (BET specific surface area=82 m$^2$/g) is obtained. As a method of obtaining a fine powder of tungsten oxide efficiently, thermal plasma processing is described in JP-A2006-102737 (KOKAI). By applying the thermal plasma processing, a fine powder with a particle diameter of 1 nm to 200 nm is obtained. However, when the tungsten oxide powder produced by applying one of these methods is used as it is, the hydrophilicity by light is insufficient, and the hydrophilicity cannot be sustained for a long period. Thus, in the current situation, a tungsten oxide film exhibiting practical hydrophilicity has not been obtained.

DETAILED DESCRIPTION

In one embodiment, a hydrophilic member includes a substrate having a surface and particles existing at least on the surface of the substrate. The particles are constituted of at least one selected from tungsten oxide particles and tungsten oxide composite particles. The surface has an arithmetic mean roughness Ra in a range of 1 nm to 1000 nm with a reference length of 100 μm, and exhibits hydrophilicity independently of light.

In one embodiment, a hydrophilic product includes the hydrophilic member of the embodiment.

A hydrophilic member according to an embodiment includes a substrate and particles existing at least on a surface of the substrate. On the surface of the substrate, at least one particles (hereinafter referred to as tungsten oxide based particles) selected from tungsten oxide particles and tungsten oxide composite particles exist. The surface on which the particles exist has an arithmetic mean roughness Ra in the range of 1 nm to 1000 nm with a reference length of 100 μm, and exhibits hydrophilicity independently of light.

In the hydrophilic member of this embodiment, the particles which are made to exist on the surface of the substrate are not limited to particles of tungsten oxide, and may be particles of a tungsten oxide composite. The tungsten oxide composite is such that tungsten oxide as a main constituent contains a transition metal element or other metal elements. The transition metal element is an element with an atomic number from 21 to 29, 39 to 47, 57 to 79, or 89 to 109. It is preferred that the tungsten oxide composite include at least one metal element selected from Ti, Zr, Mn, Fe, Pd, Pt, Cu, Ag, Zn, Al, and Ce. At least one metal element selected from Cu, Ag, and Zn is effective and a small amount of which can improve photocatalytic performance or the like.

It is preferred that the content of the metal element such as the transition metal element in the tungsten oxide composite is in the range of 0.001 mass % to 50 mass %. When the content of the metal element is more than 50 mass %, it is possible that the characteristics of the tungsten oxide particles decrease. It is more preferred that the content of the metal element be 10 mass % or less, furthermore preferably 5 mass % or less. The lower limit value of the content of the metal element is not particularly limited, but it is preferred that the content thereof be 0.001 mass % or more, more preferably 0.01 mass % or more. For avoiding decrease of dispersibility of the aqueous dispersion liquid, it is preferred that the content and form of the metal element be adjusted so as not to cause a large change in pH and zeta potential. It is preferred that the content of at least one metal element selected from Cu, Ag, and Zn be in the range of 0.001 mass % to 1 mass %.

In the tungsten oxide composite used for the hydrophilic member, the metal element may exist in various forms. The tungsten oxide composite can contain a metal element in the form of a single metal element, a compound including a metal element (compound including oxide), a complex compound of tungsten oxide, or the like. The metal element contained in the tungsten oxide composite may itself form a compound with other elements. An example of a typical form of the metal element is oxide. The metal element is mixed with, for example, a tungsten oxide powder in the form of a single element, a compound, a complex compound, or the like. The metal element may be carried by the tungsten oxide.

The method of combining the tungsten oxide with the metal element (specifically a single element, a compound, or a complex compound of at least one element selected from Ti, Zr, Mn, Fe, Pd, Pt, Cu, Ag, Zn, Al, and Ce) is not particularly limited, and various combining methods such as a mixing method to mix powders with each other, an impregnation method, a carrying method, and so on can be applied. A typical combining method is described below. An example of a method of combining copper with tungsten oxide is a method to mix a tungsten oxide powder with a copper oxide powder. Another effective method is such that the tungsten oxide powder is added and mixed in an aqueous solution of copper nitrate or copper sulfate or an ethanol solution, dried thereafter to a temperature from 70° C. to 80° C., and burned at temperatures from 500° C. to 550° C.

Further, it is also possible to apply a method to disperse a tungsten oxide powder in an aqueous copper chloride solution or an aqueous copper sulfate solution, and dry this dispersion liquid (impregnation method). The impregnation method is not limited to a method of combining copper, and can be applied to a method of combining iron using an aqueous iron chloride solution, a method of combining silver using an aqueous silver chloride solution, a method of combining platinum using an aqueous platinum chloride solution, a method of combining palladium using an aqueous palladium chloride solution, and the like. Moreover, tungsten oxide may be combined with a metal element (oxide) using an oxide sol such as a titanium oxide sol or an alumina sol. Besides them, various combining methods can be applied.

The hydrophilic member of this embodiment is produced by applying a method such as, for example, causing tungsten oxide based particles to adhere on the surface of a substrate, forming a film (coating film or the like) containing the tungsten oxide based particles on the surface of the substrate, kneading the tungsten oxide based particles into the substrate, or forming a surface layer containing the tungsten oxide based particles in a forming process of the substrate. The tungsten oxide based particles can exist on any surface of the substrate. Examples of the substrate of the hydrophilic member include a glass, aplastic, a resin such as acrylic resin, a paper, a fiber, a metal, a wood, and the like. The method of forming the surface having the tungsten oxide based particles is selected appropriately depending on the material of the substrate.

It is preferred that the amount of the tungsten oxide based particles in the surface of the hydrophilic member is in the range of 5 mass % to 95 mass %. Here, the amount of the tungsten oxide based particles denotes the content of particles in a film when the particles are made to exist in a film, and denotes the content of particles in the substrate on the surface when the particles are kneaded into the substrate. When the content of the particles is less than 5 mass %, it is possible that the hydrophilicity of the tungsten oxide based particles cannot be exhibited sufficiently. When the content of the particles is more than 95 mass %, it is possible that insufficient strength in the surface occurs.

An example of a method for allowing the tungsten oxide based particles to adhere on the surface of the substrate is a method to apply a dispersion liquid, which is produced by mixing the tungsten oxide based particles with a dispersion medium such as water or alcohol and performing dispersion processing thereof by an ultrasonic dispersion machine, a wet jet mill, a beads mill, or the like, on the substrate surface by applying a general application method such as spin coating, dipping, spraying, or the like. When the tungsten oxide based particles have photocatalytic performance, for exhibiting the photocatalytic performance after they are deposited on a surface, conditions not to give too much distortion to particles in the dispersion processing are set preferably.

When a coating film is formed on the surface of the substrate, a dispersion liquid of the above-described tungsten oxide based particles (for example, an aqueous dispersion liquid) is mixed with a binder component or the like to produce a coating material, and this coating material is applied on the surface of the substrate, thereby forming a film containing the tungsten oxide based particles. The coating material contains at least one binder component selected from an inorganic binder and an organic binder together with the aqueous dispersion liquid. It is preferred that the content of the binder component be in the range of 5 mass to 95 mass %. When the content of the binder component is more than 95 mass %, it is possible that desired performance (hydrophilicity or the like) cannot be obtained. When the content of the binder component is less than 5 mass %, sufficient coupling force cannot be obtained, and the film characteristics may decrease. By applying such a coating material on a substrate surface, strength, hardness, adhesion strength to the substrate, and the like of the film can be adjusted to a desired state.

As the organic binder, for example, there is used a product obtained by decomposing a hydrolytic silicon compound such as an alkyl silicate, a silicon halide, and a partial hydrolytic product of them, an organic polysiloxane compound or a polycondensate thereof, silica, colloidal silica, water glass, a silicon compound, phosphate such as zinc phosphate, metal oxide such as zinc oxide, alumina, or zirconia, dense phosphate, cement, gypsum, lime, frit for enamel. As the organic binder, for example, there is used fluorine based resin, silicone resin, acrylic resin, epoxy resin, polyester resin, melamine resin, urethane resin, alkyd resin.

Among the above-described binder components, at least one selected from silica ($SiO_2$), alumina ($Al_2O_3$), and zirconia ($ZrO_2$) exhibits hydrophilicity and thus is a preferable material. Particularly, the silica exhibits high hydrophilicity. These metal oxides may exist with any structure of crystal structure and amorphous structure in the coating film, but preferably exist as amorphous oxide in the film in consideration of film formability or the like. Here, when the tungsten oxide based particles have the photocatalytic performance, it is possible to clean up the surface of the member by an effect of decomposing organic matters. In order to maintain the hydrophilicity based on the photocatalytic performance for a long period, it is preferred that the content of metal oxide as a binder component be in the range of 10 mass % to 50 mass %.

It is preferred that the thickness of the film formed using the aqueous dispersion liquid or the coating material be in the range of 2 nm to 2000 nm. When the film thickness is smaller than 2 nm, it is difficult to form a uniform film. When the film thickness is larger than 2000 nm, adhesion strength of the film to the substrate decreases. It is more preferred that the film thickness be in the range of 2 nm to 1000 nm, furthermore preferably in the range of 2 nm to 400 nm. In consideration of an effect of exhibiting hydrophilicity by a film containing the tungsten oxide based particles or practicability such as strength of the substrate having such a film, it is desirable that the film thickness is in the range of 4 nm to 100 nm. When the tungsten oxide based particles are kneaded in the substrate, the tungsten oxide based particles may be exposed at least on a surface to which hydrophilicity is added.

It is preferred that the tungsten oxide based particles used for the hydrophilic member have a mean particle diameter in the range of 1 nm to 200 nm. Further, it is preferred that a BET specific surface area of the tungsten oxide based particles be in a range of 4.1 $m^2/g$ to 820 $m^2/g$. The mean particle diameter is a mean primary particle diameter (D50) of the tungsten oxide based powder. A powder, which is used for forming a film or the like, or a film or the like is evaluated directly by SEM, TEM, or the like, and the mean primary particle diameter (D50) is obtained based on a mean particle diameter (D50) of integrated diameters with reference to volumes of particles with n=50 or more from an image analysis of a picture. The mean particle diameter (D50) may match the mean particle diameter converted from the specific surface area.

In order to obtain a surface which excels in hydrophilicity, it is preferred that the tungsten oxide based particles exist in a uniform state in the surface. From this point, it is preferred that the tungsten oxide based particles have a small mean particle diameter and a large specific surface area. When the mean primary particle diameter (D50) of the tungsten oxide based particles is larger than 200 nm or when the BET specific surface area is smaller than 4.1 $m^2/g$, sufficient properties (hydrophilicity and the like) cannot be obtained. When the mean primary particle diameter of the tungsten oxide based particles is smaller than 1 nm or the BET specific surface area is larger than 820 $m^2/g$, the particles are too small, which provide poor handleability as a powder and hence are less practicable.

Generally, the larger the specific surface area and the smaller the particle diameter, the higher the performance of the photocatalyst powder. In the tungsten oxide based particles having photocatalytic performance, when the mean primary particle diameter is larger than 200 nm or when the BET specific surface area is smaller than 4.1 $m^2/g$, the photocatalytic performance decreases, and it is difficult to form a uniform and stable film. This also decreases the photocatalytic performance. When the primary particle diameter of the tungsten oxide based particles is too small, the dispersibility decreases and it is difficult to produce a uniform dispersion liquid or coating material. With such a dispersion liquid or coating material, the uniformity of the film decreases, and it is possible that sufficient photocatalytic performance cannot be obtained.

It is preferred that the mean primary particle diameter of the tungsten oxide based particles is in the range of 2.7 nm to 75 nm, more preferably in the range of 5.5 nm to 51 nm. It is preferred that the BET specific surface area be in the range of 11 $m^2/g$ to 300 $m^2/g$, more preferably in the range of 16 $m^2/g$ to 150 $m^2/g$. When the dispersion liquid or coating material including the tungsten oxide based particles is used to form a film or when it is kneaded with a substrate and used, if the particle diameter is too small, the dispersibility of the tungsten oxide based particles decreases. For improving this point, preferably the tungsten oxide based particles with a mean primary particle diameter of 5.5 nm or larger is used.

In addition, the tungsten oxide based particles (powder) used for the hydrophilic member may contain metal elements as impurities. It is preferred that the content of metal elements as impurity elements be 2 mass % or less. As the impurity metal elements, there are elements generally included in a tungsten ore and contamination elements or the like which are mixed in when a tungsten compound or the like used as a raw material is produced, and examples include Fe, Mo, Mn, Cu, Ti, Al, Ca, Ni, Cr, Mg, and so on. It is not applicable when these elements are used as component elements of a composite.

The surface of the hydrophilic member of this embodiment (surface having the tungsten oxide based particles) is characterized in that it exhibits hydrophilicity independently of light. The light mentioned here refers to general light including visible light, light having a wavelength in the ultraviolet range, and the like, which are irradiated from a general illumination, such as a white fluorescent light, sunlight, a white LED, an electric bulb, a halogen lamp, or a xenon lamp, or a blue light emitting diode, a blue laser, or the like as a light source. The surface of the hydrophilic member exhibits hydrophilicity irrespective of the above-described type of light and further presence of light irradiation. With a member having such a surface, it is possible to largely extend a retaining time of hydrophilicity in a dark place.

The surface of the hydrophilic member has an arithmetic mean roughness Ra in the range of 1 nm to 1000 nm with a reference length of 100 µm. The arithmetic mean roughness Ra is a value defined in JIS B0601 (2001), and can be calculated from a cross-sectional curve observed and measured using a surface shape measuring apparatus, a scanning probe microscope, an electron microscope, or the like. For obtaining high hydrophilic performance, it is preferred that the surface be smooth, but for extending the retaining time of hydrophilic performance, slight irregularities are needed on the surface. Accordingly, the arithmetic mean roughness Ra of the surface is 1 nm or larger.

On the other hand, when the arithmetic mean roughness Ra is larger than 1000 nm with the reference length of 100 nm, irregularities of the surface to which hydrophilicity is to be added become too large. Accordingly, effects such as anti-fogging, stain-proofing, and the like which are original effects based on hydrophilicity cannot be obtained. When the arithmetic mean roughness Ra is higher than 1000 nm, the surface becomes clouded and is liable to be stained due to the irregularities of the surface, and removal of stain by water is difficult. It is preferred that the arithmetic mean roughness Ra with the reference length of the surface of the hydrophilic member of 100 µm be in the range of 2 nm to 400 nm, more preferably in the range of 2 nm to 100 nm.

When the tungsten oxide based particles exist non-uniformly in the surface, such as when coarse particles of the tungsten oxide or the tungsten oxide composite exist in the surface, the arithmetic mean roughness Ra becomes large. In such a case, the activity which the tungsten oxide based particles originally have is impaired, and the hydrophilic performance of the surface decreases. Moreover, when the arithmetic mean roughness Ra of the surface is significantly large, measurement of contact angle as an evaluation method of hydrophilicity becomes difficult itself.

It is preferred that the surface of the hydrophilic member be such that a mean length RSm of contour curve elements (coarse curve elements) with the reference length of 100 µm is twice or more than the arithmetic mean roughness Ra. When the RSm is twice or more than the Ra, the surface becomes more smooth, and high hydrophilicity can be exhibited. When the RSm is less than twice the Ra, irregularities of the surface become large. It is preferred that the mean length RSm of the contour curve elements of the surface of the hydrophilic member be triple or more than the arithmetic mean roughness Ra.

Further, in the surface of the hydrophilic member, it is preferred that a crystal direction of the tungsten oxide based particles be not oriented. The orientation state of the crystal direction of the surface can be checked by performing X-ray diffraction or back scattering electron diffraction. For example, among peaks with 2θ existing in the range of 22° to 25° in X-ray diffraction, when the diffraction peak with the maximum intensity is denoted by A, the diffraction peak with the second largest intensity is denoted by B, and the diffraction peak with the third largest intensity is denoted by C, it is possible to determine that the crystal direction is not oriented when one of the following conditions (1) to (3) is satisfied. In measurement of peak intensity, a high position of a mountain is taken as a peak, and its height is read as intensity. When there is a shoulder, its height is read as peak intensity.

(1) When three peaks exist, an intensity ratio of peak B to peak A (B/A) is 0.3 or more, and an intensity ratio of peak C to peak A (C/A) is 0.3 or more.

(2) When two peaks exist, with lowest intensity in a valley between peak A and peak B being denoted by D, the intensity ratio of peak B to peak A (B/A) is 0.3 or more, and peak D is larger than the intensity of peak B by ½ (D>B/2).

(3) When only one peak exists, a half value width of a peak is 1° or more.

When the tungsten oxide based particles existing in the surface of the hydrophilic member have an amorphous structure, it is not possible to obtain desired properties. Accordingly, the tungsten oxide based particles having a crystal structure are made to exist in the surface of the hydrophilic member. However, when the entire surface is seen as described above, it is preferred that the tungsten oxide based particles exist in the surface so that the crystal direction of the tungsten oxide is not in an oriented state.

A typical crystal structure of the tungsten oxide is $ReO_3$ structure, and thus the crystal face with high reaction activity having oxygen in an outermost layer of the surface exposes easily. Accordingly, it absorbs water and exhibits high hydrophilicity. In the tungsten oxide film produced by a vapor deposition method, sputtering method, or sol gel method, the crystal becomes amorphous when the film is formed, and hence it is difficult to become hydrophilic. When it is heat treated and improved in crystallinity, such a film becomes a hydrophilic surface. However, when the heat treatment temperature is increased, the crystal is oriented and the hydrophilicity decreases at the same time. This is conceivably due to that the crystal face which hardly exhibits hydrophilicity is large at the surface.

On the other hand, the tungsten oxide based particles are used to form the surface in the hydrophilic member of the embodiment. Accordingly, it is possible to allow the tungsten oxide or the tungsten oxide composite with high crystallinity to exist in the surface, and further there is obtained a state that a crystal face exhibiting hydrophilicity is directed toward an arbitrary direction. Then, it is possible to allow the tungsten oxide based particles to exist in the entire surface uniformly, and thus it is possible to obtain a surface indicating higher hydrophilicity than by other film forming methods.

It is preferred that the surface of the hydrophilic member of this embodiment exhibit the photocatalytic performance under irradiation with visible light. Generally, the visible light is light having a wavelength in the region of 380 nm to 830 nm, and is light irradiated from a general illumination, such as a white fluorescent light, sunlight, a white LED, an electric bulb, a halogen lamp, or a xenon lamp, or a blue light emitting diode, a blue laser, or the like as a light source. The hydrophilic member of this embodiment exhibits the photocatalytic performance in an ordinary indoor environment. The photocatalytic performance is an operation such that upon absorption of light, a pair of electron and positive hole is excited with respect to one photon, and the excited electron and positive hole activate hydroxyl or acid at the surface by oxidation-reduction, and an active oxygen species generated by this activation oxidatively decomposes organic gas and the like, and is further an operation to exhibit hydrophilicity, antibacterial/disinfection performance, and the like.

In order to give the photocatalytic performance to the surface of the hydrophilic member, the surface is formed using the tungsten oxide based particles having the photocatalytic performance. For example, high photocatalytic performance can be obtained using particles of tungsten trioxide having a crystal structure of at least one selected from monoclinic crystal and triclinic crystal (monoclinic crystal, triclinic crystal, or mixed crystal of monoclinic crystal and triclinic crystal) or a crystal structure in which rhombic crystal is mixed therewith, or particles of a composite based on this tungsten trioxide. Moreover, the photocatalytic performance can be improved further when the crystal structure of the tungsten trioxide is a mixed crystal of monoclinic crystal and triclinic crystal or a mixed crystal of monoclinic crystal, triclinic crystal, and rhombic crystal.

The photocatalytic performance of the hydrophilic member, namely, decomposing performance for organic matters is evaluated by, for example, applying oleic acid on a surface and measuring a change over time of a contact angle with water while irradiating the surface with visible light. When the surface has the photocatalytic performance, even when the contact angle is large just after the film or the like is formed, the oleic acid is decomposed and thereby the contact angle decreases, and soon the photocatalytic performance is exhibited.

It is preferred that the tungsten oxide based particles (powder) used for the aqueous dispersion liquid in this embodiment be produced by the following method, but it is not limited thereto. It is preferred that the tungsten oxide particles be produced applying a sublimation process. Further, combining a heat treatment process with the sublimation process is also effective. With tungsten trioxide based particles produced by such a method, the above-described mean primary particle diameter and BET specific surface area can be achieved stably. Moreover, the mean primary particle diameter approximates to the value converted from the BET specific surface area, and particles with small dispersion in particle diameter (fine powder) can be provided stably.

The sublimation process will be described. The sublimation process is a process in which tungsten trioxide particles are obtained by sublimating a metal tungsten powder, a tungsten compound powder, or a tungsten compound solution in an oxygen atmosphere. The sublimation is a phenomenon that a state change from a solid phase to a vapor phase, or from a vapor phase to a solid phase occurs without undergoing a liquid phase. The tungsten oxide powder can be obtained by oxidizing the metal tungsten powder, tungsten compound powder, or tungsten compound solution as a raw material while sublimating it.

Any one of the metal tungsten powder, tungsten compound powder, and the tungsten compound solution may be used as the raw material (tungsten material) in the sublimation process. Examples of the tungsten compound used as the raw material include tungsten trioxide ($WO_3$), tungsten dioxide ($WO_2$), tungsten oxide of a low-grade oxide or the like, tungsten carbide, ammonium tungstate, calcium tungstate, tungstic acid, and the like.

By performing the sublimation process of the tungsten raw material as described above in the oxygen atmosphere, the metal tungsten powder or the tungsten compound powder is turned from a solid phase to a vapor phase instantly, and further the metal tungsten vapor turned to a vapor phase is oxidized, to thereby obtain tungsten oxide particles. Even when the solution is used, it turns to a vapor phase after being tungsten oxide or compound. Thus, the tungsten oxide particles can be obtained using oxidation reaction in a vapor phase. Moreover, the crystal structure of the tungsten oxide particles can be controlled.

As the raw material for the sublimation process, preferably at least one selected from a metal tungsten powder, a tungsten oxide powder, a tungsten carbide powder, and an ammonium tungstate powder is used since the tungsten oxide particles obtained by sublimation in the oxygen atmosphere hardly include impurities. The metal tungsten powder and the tungsten oxide powder are preferred particularly as raw materials for the sublimation process since they do not include any harmful by-product (substance other than the tungsten oxide) formed in the sublimation process.

As the tungsten compound used for the raw material, a compound including tungsten (W) and oxygen (O) as its constituent elements is preferred. Including W and O as constituent elements makes it easy to be sublimated instantly when inductively-coupled plasma processing or the like described later is applied in the sublimation process. Examples of such a tungsten compound include $WO_3$, $W_{20}O_{58}$, $W_{18}O_{49}$, $WO_2$, and the like. Further, a solution, salt, or the like of tungstic acid, ammonium paratungstate, or ammonium metatungstate, is also effective.

When the tungsten oxide composite particles are produced, a transition metal element or other elements may be mixed in the form of metal, compound including oxide, complex compound, or the like, in addition to the tungsten material. By processing the tungsten oxide with other elements at once, complex compound particles of complex oxide of the tungsten oxide and other elements, or the like can be obtained. The tungsten oxide composite particles can also be obtained by mixing the tungsten oxide particles with or carrying them on single particles or compound particles of other metal elements. The method of combining the tungsten oxide with other metal elements is not particularly limited, and it is possible to apply various publicly known methods.

It is preferred that the metal tungsten powder or the tungsten compound powder as the tungsten material have a mean particle diameter in the range of 0.1 μm to 100 μm. The mean particle diameter of the tungsten material is more preferably in the range of 0.3 μm to 10 μm, furthermore preferably in the range of 0.3 μm to 3 μm, desirably in the range of 0.3 μm to 1.5 μm. When the metal tungsten powder or the tungsten compound powder having the mean particle diameter in the above ranges is used, sublimation occurs easily.

When the mean particle diameter of the tungsten material is smaller than 0.1 μm, the raw material powder is too fine. Thus, pre-adjustment of the raw material powder becomes necessary, handleability decreases, and additionally the cost increases, thereby making it unfavorable in an industrial aspect. When the mean particle diameter of the tungsten material is larger than 100 μm, uniform sublimation reaction does not occur easily. Even when the mean particle diameter is large, processing with a large energy amount can cause uniform sublimation reaction, but this is unfavorable in an industrial aspect.

An example of the method of sublimating the tungsten material in the oxygen atmosphere in the sublimation process is at least one processing selected from inductively coupled plasma processing, arc discharge processing, laser processing, electron beam processing, and gas burner processing. Among them, in the laser processing or the electron beam processing, laser or electron beam is irradiated to perform the sublimation processing. The laser or electron beam has a small irradiation spot diameter, and thus it takes time to process a large amount of raw material at once. However, they have an advantage that it is not necessary to strictly control the particle diameter or stability of supply amount of the raw material powder.

The inductively coupled plasma processing or the arc discharge processing needs adjustment of a generating area of plasma or arc discharge, but it is capable of allowing oxidation reaction of a large amount of raw material powder to occur at once in the oxygen atmosphere. Further, the amount of raw material to be processed at once can be controlled. The gas burner processing needs a relatively low power cost, but it is difficult to process a large amount of raw material powder or raw material solution. Accordingly, the gas burner processing is inferior in productivity. In addition, the gas burner processing may be one having sufficient energy for causing sublimation, and is not particularly limited. A propane gas burner, an acetylene gas burner, or the like is used.

When the inductively coupled plasma processing is applied to the sublimation process, generally there is used a method in which plasma is generated using argon gas or oxygen gas, and the metal tungsten powder or the tungsten compound powder is supplied into this plasma. Examples of the method of supplying the tungsten material into the plasma include a method to blow the metal tungsten powder or the tungsten compound powder together with carrier gas, a method to spray a dispersion liquid in which the metal tungsten powder or the tungsten compound powder is dispersed in a predetermined liquid dispersion medium.

Examples of the carrier gas used when the metal tungsten powder or the tungsten compound powder is blown into the plasma include air, oxygen, inert gas containing oxygen, and the like. Among them, the air is used preferably because of its low cost. When oxygen is contained enough in the reaction field, like in the case where reaction gas including oxygen is supplied other than the carrier gas, the case where the tungsten compound powder is the tungsten trioxide, or the like, inert gas such as argon or helium may be used as the carrier gas. For the reaction gas, preferably oxygen, inert gas including oxygen, or the like is used. When the inert gas including oxygen is used, preferably the oxygen amount is set so that it is possible to sufficiently supply a necessary oxygen amount for oxidation reaction.

By applying the method of blowing the metal tungsten powder or the tungsten compound powder together with carrier gas, and adjusting the gas flow rate or the pressure or the like in a reaction container, the crystal structure of the tungsten trioxide particles can be controlled easily. Specifically, it is easy to obtain tungsten trioxide particles having a crystal structure of at least one selected from monoclinic crystal and triclinic crystal (monoclinic crystal, triclinic crystal, or mixed crystal of monoclinic crystal and triclinic crystal) or one in which rhombic crystal is mixed therewith. It is preferred that the crystal structure of the tungsten trioxide particles be a mixed crystal of monoclinic crystal and triclinic crystal or a mixed crystal of monoclinic crystal, triclinic crystal, and rhombic crystal.

An example of the dispersion medium used for producing the dispersion liquid of the metal tungsten powder and the tungsten compound powder is a liquid dispersion medium having oxygen atoms in molecules. Using the dispersion liquid facilitates handling of the raw material powder. As the liquid dispersion medium having oxygen atoms in molecules, for example, there is used one including at least one selected from water and alcohol by 20 capacity % or more. As the alcohol used as the liquid dispersion medium, for example, at least one selected from methanol, ethanol, 1-propanol, and 2-propanol is preferred. Since water and alcohol easily evaporate by heat of plasma, they do not hinder sublimation reaction or oxidation reaction of the raw material powder, and they easily facilitate oxidation reaction because they contain oxygen in molecules.

When the metal tungsten powder or the tungsten compound powder is dispersed in the dispersion medium to produce the dispersion liquid, it is preferred that the metal tungsten powder or the tungsten compound powder be included in the range of 10 mass % to 95 mass %, more preferably in the range of 40 mass % to 80 mass % in the dispersion liquid. By dispersing in the dispersion liquid in such a range, the metal tungsten powder or the tungsten compound powder can be dispersed uniformly in the dispersion liquid. When it is dispersed uniformly, uniform sublimation reaction of the raw material powder can occur easily. When the content in the dispersion liquid is less than 10 mass %, the amount of the raw material powder is too small, and it cannot be produced efficiently. When the content is more than 95 mass %, the amount of the dispersion liquid is small, the viscosity of the raw material powder increases and makes it sticky to the container, and thus the handleability decreases.

By applying the method to have the metal tungsten powder or the tungsten compound powder in the dispersion liquid and blowing it into plasma, the crystal structure of the tungsten trioxide particles can be controlled easily. Specifically, tungsten trioxide particles having a crystal structure of at least one selected from monoclinic crystal and triclinic crystal or one in which rhombic crystal is mixed therewith can be obtained easily. Further, also by using a tungsten compound solution as the raw material, the sublimation reaction can be performed uniformly, and moreover, controllability of the crystal structure of the tungsten trioxide particles improves. The method using the dispersion liquid as described above is also applicable in the arc discharge processing.

When the sublimation process is performed by irradiating with laser or electron beam, preferably pelletized metal tungsten or tungsten compound is used as the raw material. The laser or electron beam has a small irradiation spot diameter, and thus supply becomes difficult when the metal tungsten powder or the tungsten compound powder is used. However, using the pelletized metal tungsten or tungsten compound makes it possible to perform sublimation efficiently. The laser may be one having sufficient energy for sublimating the metal tungsten or the tungsten compound and is not particularly limited, but $CO_2$ laser is preferred because of its high energy.

When the pellets are irradiated with the laser or electron beam, moving at least one of the irradiation source of the laser light or electron beam and the pellets enables to effectively sublimate the entire surface of a pellet having a certain degree of size. This makes it easy to obtain the tungsten trioxide powder having a crystal structure in which rhombic crystal is mixed with at least one selected from monoclinic crystal and triclinic crystal. The pellets as described above are also applicable in the inductively coupled plasma processing and the arc discharge processing.

The tungsten oxide based particles used for the hydrophilic member of this embodiment can be obtained just by the sublimation process as described above, but it is also effective to perform heat treatment process on the tungsten oxide based particles produced in the sublimation process. The heat treatment process is to heat treat the tungsten trioxide based particles obtained in the sublimation process at predetermined temperatures and for predetermined time in an oxidative atmosphere. Also in the case where the tungsten trioxide particles cannot be formed sufficiently by condition control or the like in the sublimation process, the percentage of the tungsten trioxide particles in the tungsten oxide particles can be 99% or more, substantially 100%, by performing the heat treatment. Moreover, the crystal structure of the tungsten trioxide particles can be adjusted to a predetermined structure in the heat treatment process.

Examples of the oxidative atmosphere used in the heat treatment process include air and oxygen-containing gas. The oxygen-containing gas means inert gas containing oxygen. It is preferred that the heat treatment temperature be in the range of 200° C. to 1000° C., more preferably 400° C. to 700° C. It is preferred that the heat treatment time is in the range of 10 minutes to 5 hours, more preferably 30 minutes to 2 hours. By having the temperature and time of the heat treatment process in the above-described ranges, the tungsten trioxide can be formed easily from tungsten oxide other than the tungsten trioxide. Further, to obtain a powder with less defects and good crystallinity, it is preferred that temperature increase or temperature decrease during heat treatment be performed gradually. Rapid heating or cooling during heat treatment leads to decrease of crystallinity.

When the heat treatment temperature is lower than 200° C., it is possible that an oxidation effect for turning a powder which did not become the tungsten trioxide in the sublimation process to the tungsten trioxide is not obtained sufficiently. When the heat treatment temperature is higher than 1000° C., the tungsten oxide particles grow rapidly, and thus the specific surface area of the obtained fine tungsten oxide powder can decrease easily. Moreover, by performing the heat treatment process at the temperatures and for the time as described above, it is possible to adjust the crystal structure and crystallinity of the fine tungsten trioxide powder.

A hydrophilic product of this embodiment includes the above-described hydrophilic member, and is formed by applying the hydrophilic member to a relevant member used in this product. Specific examples of the hydrophilic product include air-conditioners, air cleaning devices, electric fans, refrigerators, microwave ovens, dishwasher/driers, rice cookers, pot lids, pots, IH heaters, washing machines, vacuum cleaners, lighting apparatuses (lamps, apparatus bodies, shades, and the like), sanitary products, toilets, washbowls, mirrors, bathrooms (walls, ceilings, floors, and the like), building materials (interior walls, ceiling materials, floors, and exterior walls), interior products (curtains, carpets, tables, chairs, sofas, shelves, beds, beddings, and the like), glasses, sashes, handrails, doors, knobs, clothes, filters used for home electric appliance or the like, stationery, kitchen utensils, members used in the inside space of a car, and the like.

The hydrophilic member and the hydrophilic product of this embodiment have high hydrophilicity irrespective of presence of light irradiation, and are further capable of maintaining the performance for a long time. Therefore, it is possible to provide a member and a product capable of exhibiting high hydrophilicity for a long time even in a dark place. When the tungsten oxide based particles having the photocatalytic performance are used, it is possible to provide a member or a product having decomposing performance for organic matters based on the photocatalytic performance, hydrophilicity, antibacterial/disinfection performance, and the like.

Generally, metal oxide is hydrophilic, and it is considered that titanium oxide and tungsten oxide are hydrophilic on their surfaces. However, in a material produced by a conventional producing method, the hydrophilicity decreases in a short time in the atmosphere, and the hydrophilic member cannot be obtained in a normal state. In this embodiment, since the particles of the tungsten oxide and the tungsten oxide composite which are originally hydrophilic are used, it is possible to achieve a member and a product exhibiting hydrophilicity independently of light. Therefore, it is possible to provide a member and a product which have a largely extended hydrophilicity retaining time in a dark place, and are capable of obtaining effects such as stain-proofing, anti-fogging, and stain removal for a long period.

Moreover, by forming the surface of the member using the tungsten oxide based particles exhibiting the photocatalytic performance under irradiation with visible light, even when the hydrophilicity decreases due to stains by organic matters, the surface can become hydrophilic within a short time by irradiation with light. Using such a member or a product in an environment where there is visible light irradiation, it is possible to achieve effects based on the photocatalytic performance such as decomposing performance for organic gas and antibacterial/disinfection performance.

EXAMPLES

Next, specific examples and evaluation results thereof will be described. Note that in the examples below, as a method of producing a powder, there is used a method applying inductively coupled plasma processing in the sublimation process, but it is not limited to this method.

Example 1

First, the tungsten trioxide powder with a mean particle diameter of 0.5 μm was prepared as a raw material powder. This raw material powder was sprayed with carrier gas (Ar) on RF plasma, and further, as reaction gas, argon was supplied at a flow rate of 40 L/min and oxygen at a flow rate of 40 L/min. In this manner, the sublimation process of subjecting the raw material powder to oxidation reaction while sublimating it was carried out to produce a tungsten oxide powder. Moreover, the tungsten oxide powder was heat treated under conditions of 1050° C.×0.25 hour.

The mean primary particle diameter (D50) and the BET specific surface area of the tungsten oxide powder were measured. The mean primary particle diameter was measured by image analysis of a TEM picture. For TEM observation, H-7100FA made by Hitachi was used, an enlarged picture was subjected to image analysis and 50 particles or more were extracted, and integrated diameters with reference to volumes were obtained to calculate the D50. Measurement of the BET specific surface area was performed using a specific surface area measuring apparatus Macsorb 1201 made by Mountech. Preprocessing was carried out under conditions of 200° C.×20 minutes in nitrogen. The mean primary particle diameter (D50) and the BET specific surface area are shown in Table 1.

Next, after the tungsten oxide powder is mixed with water, ultrasonic dispersion processing was performed to produce a dispersion liquid. The dispersion liquid was spread on a glass plate of 5 cm×5 cm, and dried at 200° C. for 30 minutes, so as to produce a sample on which tungsten oxide particles of 0.05 g are applied. Surface roughness Ra, RSm of the obtained film was measured. The surface roughness is measured with a reference length of 100 μm using a surface profiler Dektak 6M made by Ulvac. Consequently, the Ra was 150 nm and RSm was 618 nm. Moreover, X-ray diffraction of the film was perform to check orientation of a crystal direction. The X-ray diffraction was performed using an X-ray diffractometer JDX-3500 made by JEOL. Consequently, it was recognized that the crystal direction is not oriented.

Next, hydrophilicity of the film was evaluated as follows. The contact angle of the film with a water droplet of 0.4 mg was measured using a contact angle meter (CA-D made by Kyowa Interface Science) at every certain time. The contact angle was measured just after the film was produced, after it was stored for three days in a dark place in an environment of an ordinary laboratory, and after it was stored further for one month in the dark place. Moreover, the film after being stored for one month in the dark place is irradiated with visible light for one hour, and thereafter the contact angle was measured. A white fluorescent light (FL20SS W/18, made by Toshiba Lighting & Technology) was used as a light source, and an ultraviolet cutting filter (Kralex N-169, made by Nitto Jushi Kogyo) was used to cut wavelengths under 380 nm. Illuminance was adjusted to 1000 lx. Evaluation results thereof are shown in Table 2.

When the contact angle is in the range of 10° to 1°, it is assumed as high hydrophilicity. Particularly, when the contact angle is less than 5°, it is said to exhibit superhydrophilicity. It was recognized that the film of this example exhibits high hydrophilicity irrespective of storage in the dark place and light irradiation, and maintains the hydrophilicity for a long period.

In order to check a hydrophilic effect by organic matter decomposition of the photocatalyst, oleic acid was applied on the obtained film, and transition of the contact angle when it is irradiated with visible light having illuminance of 1000 lx was evaluated. The same light source as the above one was used. Evaluation results after 24 hours, 48 hours, and 72 hours elapsed from the visible light irradiation are shown in Table 2. For comparison, a black light (FL20S BLB JET20W made by Toshiba Lighting & Technology) was used for evaluating the contact angle after being irradiated with ultraviolet rays (0.5 mW/cm$^2$) for 72 hours.

The film of Example 1 did not exhibit sufficient hydrophilicity in the beginning of irradiation with visible light. However, it was recognized that the contact angle with water decreases over time, and the oleic acid is decomposed. This is conceivably because the tungsten oxide particles grow due to the heat treatment performed at high temperatures, and thus an effect as a photocatalyst was not sufficiently exhibited.

Example 2

The tungsten oxide powder was produced by performing the sublimation process similar to that of Example 1 except that oxygen is supplied at a flow rate of 80 L/min as reaction gas, and the pressure in the reaction container is adjusted to 25 kPa that is the decompression side. Next, using the obtained tungsten oxide powder, a film was formed on a glass plate similarly to Example 1. Properties of the tungsten oxide powder and the film were evaluated similarly to Example 1. Results thereof are shown in Table 1. Moreover, hydrophilicity of the obtained film was evaluated similarly to Example 1. Evaluation results of hydrophilicity are shown in Table 2. The film of Example 2 has a contact angle less than 1° in the dark place, and it was recognized that the film has high hydrophilicity irrespective of the dark place and light irradiation, and maintains the hydrophilicity for a long period. It was also recognized that the film has a hydrophilic effect by the photocatalyst.

Examples 3 to 5

The tungsten oxide powder was produced through the sublimation process similar to that of Example 1. Further, the tungsten oxide powder was heat treated under conditions of 500° C. to 900° C.×1 to 2 hours in the atmosphere. Next, each of the obtained tungsten oxide powders was used to form a film on a glass plate similarly to Example 1. Properties of the tungsten oxide powders and the films were evaluated similarly to Example 1. Results thereof are shown in Table 1. Moreover, hydrophilicity of the obtained films was evaluated similarly to Example 1. Evaluation results of hydrophilicity are shown in Table 2.

The glass members (films having a glass plate) in Examples 3 to 5 all have a contact angle smaller than 1° C. in the dark place, and it was recognized that they exhibit high hydrophilicity irrespective of the dark place and light irradiation, and further maintain the hydrophilicity for a long period. It was also recognized that they have a hydrophilic effect by the photocatalyst. Particularly, Example 3 and Example 4 exhibited high hydrophilicity after visible light irradiation for 72 hours. The reason why Examples 3, 4 exhibited higher photocatalytic effect than Example 2 with small particle diameters is conceivably because the crystallinity of the tungsten oxide particles improved by optimizing the production conditions.

Example 6

The tungsten oxide powder of 5 mass % obtained in Example 3 was mixed with colloidal silica of 0.5 mass %, and this mixture was dispersed in water to produce an aqueous coating material. This aqueous coating material was applied to a glass plate of 5 cm×5 cm, and thereafter dried for 30 minutes at 200° C. to form a film. Properties of the powder and the film were evaluated similarly to Example 1. Results thereof are shown in Table 1. Moreover, hydrophilicity of the film was evaluated similarly to Example 1. Evaluation results of hydrophilicity are shown in Table 2.

Example 7

The sublimation process and heat treatment process similar to those in Example 3 were performed to produce the tungsten oxide composite powder containing 300 ppm of Fe except that the tungsten oxide powder with a large amount of impurities such as Fe and Mo was used as a raw material to be placed in plasma. Next, the obtained tungsten oxide composite powder was used to form a film (0.05 g applied) on a glass plate similarly to Example 1. Properties of the powder and the film were evaluated similarly to Example 1. Results thereof are shown in Table 2. Moreover, hydrophilicity of the obtained film was evaluated similarly to Example 1. Evaluation results of hydrophilicity are shown in Table 2.

Example 8

A copper oxide (CuO) powder of 1 mass % was mixed with the tungsten oxide powder obtained in Example 3. The tungsten oxide composite powder obtained thus was used to form a film on a glass plate similarly to Example 1.

Properties of the powder and the film were evaluated similarly to Example 1. Results thereof are shown in Table 1. Moreover, hydrophilicity of the obtained film was evaluated similarly to Example 1. Evaluation results of hydrophilicity are shown in Table 2.

Example 9

Silver nitrate of 0.002 mass % by AG conversion was mixed with tungsten oxide powder of 5 mass % obtained in Example 3, and this mixture is dispersed in water to produce an aqueous dispersion liquid. After photoreduction processing was performed, the aqueous dispersion liquid was applied on a glass plate of 5 cm×5 cm and dried at 200° C. for 30 minutes to form a film (0.05 g applied). Properties of the powder and the film were evaluated similarly to Example 1. Results thereof are shown in Table 1. Moreover, hydrophilicity of the obtained film was evaluated similarly to Example 1. Evaluation results of hydrophilicity are shown in Table 2.

The glass members (glass plates having a film) by Examples 6 to 9 all exhibit high hydrophilicity irrespective of the dark place and light irradiation, similarly to Example 3, and it was recognized that they maintain hydrophilicity for a long period. It was also recognized that they have a hydrophilic effect by the photocatalyst.

Comparative Example 1

A tungsten oxide powder which is commercially available (made by Raremetallic) as a reagent or the like was evaluated. A film was formed on a glass plate similarly to Example 1, but because its particle diameter is too large it was not possible to form the film, so it was not possible to perform evaluation of the film. Only properties of the powder are shown in Table 1.

Comparative Example 2

A sputtering method was applied to form a tungsten oxide film on a glass plate heated to 600° C. Properties of the obtained film were evaluated similarly to Example 1. Results thereof are shown in Table 1. The tungsten oxide film had a crystal structure in which triclinic crystal is oriented. Moreover, hydrophilicity of the obtained film was evaluated similarly to Example 1. Evaluation results of hydrophilicity are shown in Table 2. Since the film formed by the sputtering method has an oriented crystal direction, the hydrophilicity was low just after the film was formed and after it was stored in the dark place. There was decrease of the contact angle by irradiation with visible light, but it had insufficient hydrophilicity. Decomposition performance for oleic acid was also low.

Comparative Example 3

A silica ($SiO_2$) film was formed using colloidal silica on a glass plate. Properties of the obtained film were evaluated similarly to Example 1. Results thereof are shown in Table 1. Moreover, hydrophilicity of the obtained film was evaluated similarly to Example 1. Evaluation results of hydrophilicity are shown in Table 2. The silica film exhibited high hydrophilicity just after the film was formed, but while being stored in the dark place, the film absorbed dirt in the atmosphere and its hydrophilicity decreased. No change by light irradiation was seen as well. Also decompressing performance for oleic acid was not obtained.

Comparative Example 4

Anatase-type titania sol was used to form a film on a glass plate. Properties of the obtained film was evaluated similarly to Example 1. Results thereof are shown in Table 1. Moreover, hydrophilicity of the obtained film was evaluated similarly to Example 1. Evaluation results of hydrophilicity are shown in Table 2. Here, the contact angle did not change even by irradiating the sample with visible light after it was stored for one month in the dark place, and thus the contact angle of the sample irradiated with ultraviolet rays were measured. Results thereof are shown in Table 2. Although it was small, the titanium oxide film had a hydrophilic tendency just after it was formed, but it absorbed dirt in the atmosphere during storage in the dark place and its hydrophilicity decreased. There was a tendency of contact angle to decrease after irradiation with ultraviolet rays, and an effect by light irradiation was seen. In a decomposing test of oleic acid, hydrophilicity was exhibited only when it is irradiated with ultraviolet rays.

TABLE 1

| | POWDER PROPERTIES | | | | |
| | MEAN PARTICLE DIAMETER | BET SPECIFIC SURFACE AREA | FILM PROPERTIES | | |
| | (D50) [nm] | [$m^2$/g] | Ra [nm] | RSm [nm] | ORIENTATION |
| EXAMPLE 1 | 222 | 3.7 | 150 | 618 | NONE |
| EXAMPLE 2 | 2.2 | 411 | 5 | 22 | NONE |
| EXAMPLE 3 | 24 | 33 | 10 | 34 | NONE |
| EXAMPLE 4 | 89 | 9.7 | 34 | 123 | NONE |
| EXAMPLE 5 | 195 | 4.2 | 52 | 202 | NONE |
| EXAMPLE 6 | 22 | 34 | 10 | 45 | NONE |
| EXAMPLE 7 | 26 | 30 | 11 | 29 | NONE |
| EXAMPLE 8 | 28 | 33 | 13 | 40 | NONE |
| EXAMPLE 9 | 25 | 36 | 9 | 33 | NONE |
| COMPARATIVE EXAMPLE 1 | 1210 | 0.7 | — | — | — |
| COMPARATIVE EXAMPLE 2 | — | — | 4 | 28 | PRESENT |
| COMPARATIVE EXAMPLE 3 | 10 | — | 9 | 41 | NONE |
| COMPARATIVE EXAMPLE 4 | — | — | 11 | 39 | NONE |

TABLE 2

HYDROPHILICITY EVALUATION (CONTACT ANGLE MEASUREMENT RESULTS)

| | STORAGE IN DARK PLACE | | | OLEIC ACID DECOMPOSITION TEST | | | |
|---|---|---|---|---|---|---|---|
| | | AFTER 1 MONTH | | | VISIBLE LIGHT IRRADIATION | | AFTER 72 HRS OF ULTRAVIOLET |
| | JUST AFTER DEPOSITION | AFTER 3 DAYS | VISIBLE LIGHT IRRADIATION FOR 1 HR | AFTER 24 HRS | AFTER 48 HRS | AFTER 72 HRS | LIGHT IRRADIATION |
| EXAMPLE 1 | 10 | 11 | 12 | 8 | 64 | 57 | 43 | 40 |
| EXAMPLE 2 | <1 | <1 | 2 | <1 | 68 | 48 | 19 | 18 |
| EXAMPLE 3 | <1 | <1 | <1 | <1 | 71 | 25 | 4 | 4 |
| EXAMPLE 4 | <1 | <1 | <1 | <1 | 65 | 37 | 10 | 9 |
| EXAMPLE 5 | 2 | 3 | 3 | 1 | 72 | 55 | 19 | 20 |
| EXAMPLE 6 | <1 | <1 | <1 | <1 | 67 | 22 | 3 | 5 |
| EXAMPLE 7 | <1 | 1 | 1 | <1 | 60 | 26 | 3 | 4 |
| EXAMPLE 8 | 1 | 2 | 2 | <1 | 69 | 20 | 5 | 3 |
| EXAMPLE 9 | <1 | <1 | 1 | <1 | 65 | 22 | 4 | 5 |
| COMPARATIVE EXAMPLE 1 | x | x | x | x | x | x | x | x |
| COMPARATIVE EXAMPLE 2 | 25 | 26 | 30 | 20 | 60 | 51 | 46 | 38 |
| COMPARATIVE EXAMPLE 3 | 4 | 20 | 33 | 35 | 70 | 69 | 72 | 71 |
| COMPARATIVE EXAMPLE 4 | 27 | 32 | 45 | 4* | 55 | 60 | 59 | 4 | x: NO FILM IS FORMED. MEASUREMENT IS NOT POSSIBLE.
*IRRADIATED WITH ULTRAVIOLET LIGHT INSTEAD OF VISIBLE LIGHT

Example 10 to Example 15

In Example 10, the sublimation process and heat treatment process similar to those in Example 3 were performed to produce the tungsten oxide composite powder containing 500 ppm of Zr as a raw material to be placed in plasma except that a zirconium oxide powder is mixed with the tungsten oxide powder to be used. In Example 11, the tungsten oxide powder obtained in Example 3 was dispersed in a chloroplatinic acid aqueous solution, visible light irradiation was performed and methanol was put in, and carrying by a photo-precipitation method was performed. Centrifugal separation was carried out, cleaning by removal of a supernatant liquid and addition of water was performed twice, and thereafter the powder from which the supernatant liquid is removed was dried at 110° C. for 12 hours, so as to produce a tungsten oxide composite powder containing 0.1 mass % of Pt.

In Example 12, the tungsten oxide powder obtained in Example 3 was dispersed in an aqueous palladium chloride solution. This dispersion liquid is centrifugally separated, cleaning by removal of a supernatant liquid and addition of water was performed twice, and thereafter the powder from which the supernatant liquid is removed was dried at 110° C. for 12 hours, so as to produce a tungsten oxide composite powder containing 0.5 mass % of Pd. In Example 13, a titanium oxide powder is mixed with the tungsten oxide powder obtained in Example 3 by a ratio of 5 mass %, so as to produce a tungsten oxide composite powder.

In Example 14, the tungsten oxide powder obtained in Example 3 was dispersed in a cerium chloride aqueous solution. This dispersion liquid is centrifugally separated, cleaning by removal of a supernatant liquid and addition of water was performed twice, and thereafter the powder from which the supernatant liquid is removed was dried at 110° C. for 12 hours, so as to produce a tungsten oxide composite powder containing 0.1 mass % of Ce. In Example 15, the tungsten oxide powder obtained in Example 3 was dispersed in an alumina sol, and this dispersion liquid was dried at 110° C. for 12 hours, so as to produce a tungsten oxide composite powder containing 2 mass % of alumina ($Al_2O_3$).

Regarding the tungsten oxide composite powders of Examples 10 to 14, each powder was subjected to dispersion processing by a beads mill, and applied thereafter on a glass substrate to form a film. Regarding Example 15, the dispersion liquid before it is dried was applied on a glass plate to form a film. Properties of the powders and the films were evaluated similarly to Example 1. Results thereof are shown in Table 3. Moreover, hydrophilicity of the obtained films was evaluated similarly to Example 1. Evaluation results of hydrophilicity are shown in Table 4.

In all of Examples 10 to 15, powder properties and film properties similar to those of Example 3 were obtained. Regarding hydrophilicity of the films, all the films exhibited high hydrophilicity irrespective of the dark place and light irradiation, and it was recognized that they maintain hydrophilicity for a long period. It was also recognized that each of the films have a hydrophilic effect by the photocatalyst.

TABLE 3

| | POWDER PROPERTIES | | FILM PROPERTIES | | |
|---|---|---|---|---|---|
| | MEAN PARTICLE DIAMETER (D50) [nm] | BET SPECIFIC SURFACE AREA [m²/g] | Ra [nm] | RSm [nm] | ORIENTATION |
| EXAMPLE 10 | 25 | 34 | 11 | 36 | NONE |
| EXAMPLE 11 | 27 | 33 | 15 | 44 | NONE |
| EXAMPLE 12 | 22 | 36 | 13 | 45 | NONE |

TABLE 3-continued

POWDER PROPERTIES

| | MEAN PARTICLE DIAMETER | BET SPECIFIC SURFACE | FILM PROPERTIES | | |
|---|---|---|---|---|---|
| | (D50) [nm] | AREA [m²/g] | Ra [nm] | RSm [nm] | ORIENTA-TION |
| EXAMPLE 13 | 24 | 32 | 15 | 40 | NONE |
| EXAMPLE 14 | 23 | 33 | 11 | 35 | NONE |
| EXAMPLE 15 | 25 | 30 | 14 | 41 | NONE |

TABLE 4

HYDROPHILICITY EVALUATION
(CONTACT ANGLE MEASUREMENT RESULTS)

| | | STORAGE IN DARK PLACE AFTER 1 MONTH | |
|---|---|---|---|
| | JUST AFTER DEPOSITION | | VISIBLE LIGHT IRRADIATION FOR 1 HR |
| EXAMPLE 10 | 1 | 2 | <1 |
| EXAMPLE 11 | <1 | <1 | <1 |
| EXAMPLE 12 | 1 | 1 | 1 |
| EXAMPLE 13 | 2 | 2 | 1 |
| EXAMPLE 14 | <1 | <1 | <1 |
| EXAMPLE 15 | <1 | 1 | <1 |

Example 16

The aqueous coating material produced in Example 6 was applied on a glass of the interior space of an automobile, and hydrophilicity was evaluated. The contact angle was 1° or smaller, and it was recognized that superhydrophilicity is exhibited. Accordingly, occurrence of dew condensation was suppressed, and the glass was prevented from being stained easily. Moreover, evaluation of antibacterial performance was performed using aureus bacteria, colon bacillus, and mold, and it was recognized that excellent antibacterial performance is exhibited against all of them.

The aqueous dispersion liquid and the aqueous coating material using the tungsten oxide powder and the tungsten oxide composite powder of the examples have excellent dispersibility, and thus allow to produce a member having a uniform film. Since the tungsten oxide powder and the tungsten oxide composite powder have the photocatalytic performance, the decomposition property for organic gas such as acetaldehyde can be exhibited stably, and visual problems of color unevenness and the like do not occur easily. Thus, the liquids can be used preferably for members used in the interior space of an automobile, and building materials, interior materials, home electronic appliances, and the like used in factories, shops, public facilities, houses, and the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and sprit of the inventions.

What is claimed is:

1. A method for manufacturing a hydrophilic member, comprising:
   mixing at least one kind of particles selected from the group consisting of tungsten oxide particles each having a crystal structure and tungsten oxide composite particles each having a crystal structure, with an aqueous dispersion medium including at least one selected from the group consisting of water and alcohol, to obtain a dispersion liquid containing the particles and the aqueous dispersion medium, the crystal structure of the particles including a mixture of monoclinic crystal and triclinic crystal of tungsten trioxide;
   applying the dispersion liquid on a surface of a substrate; and
   drying the dispersion liquid applied on the surface of the substrate, without firing after drying, to form a dried film containing the particles and having a surface of which an arithmetic mean roughness Ra with a reference length of 100 μm is from 1 nm to 1000 nm,
   wherein the particles in the dried film exist on the surface of the substrate in a state that a crystal direction is not oriented, and
   wherein the dried film exhibits hydrophilicity independently of light based on the particles in the dried film, and a contact angle with water of the dried film stored for a month in a dark place and tested without light irradiation is 10° or less.

2. The method according to claim 1,
   wherein a mean particle diameter of the particles is in a range of from 1 nm to 200 nm.

3. The method according to claim 1,
   wherein a BET specific surface area of the particles is in a range of 4.1 m²/g to 820 m²/g.

4. The method according to claim 1,
   wherein the dried film is formed by drying the dispersion liquid at a temperature of 200° C. or less.

5. The method according to claim 1,
   wherein the tungsten oxide composite includes a transition metal element in a range of from 0.001 mass % to 50 mass %.

6. The method according to claim 1,
   wherein the tungsten oxide composite includes at least one metal element selected from the group consisting of titanium, zirconium, manganese, iron, palladium, platinum, copper, silver, zirconium, aluminum, and cerium in a range of from 0.001 mass % to 50 mass %.

7. The method according to claim 1,
   wherein the crystal structure further includes rhombic crystal of tungsten trioxide.

8. The method according to claim 1, further comprising:
   fabricating the particles by sublimating a metal tungsten powder, a tungsten compound powder, or a tungsten compound solution in an oxygen atmosphere.

9. The method according to claim 8,
   wherein the metal tungsten powder, the tungsten compound powder, or the tungsten compound solution is sublimated by an inductively coupled plasma process in the oxygen atmosphere.

10. The method according to claim 8, further comprising:
    heat-treating the particles obtained by sublimating at a temperature of 200° C. to 1000° C. for 10 minutes to 5 hours.

11. A method for manufacturing a hydrophilic member, comprising:

mixing at least one kind of particles selected from the group consisting of tungsten oxide particles each having a crystal structure and tungsten oxide composite particles each having a crystal structure, with an aqueous dispersion medium including at least one selected from the group consisting of water and alcohol, to obtain a dispersion liquid containing the particles and the aqueous dispersion medium, the crystal structure of the particles including a mixture of monoclinic crystal and triclinic crystal of tungsten trioxide;

mixing the dispersion liquid with an inorganic binder or an organic binder to obtain a coating material containing the particles, the aqueous dispersion medium, and the binder;

applying the coating material on a surface of a substrate; and drying the coating material applied on the surface of the substrate, without firing after drying, to form a dried film containing the particles and having a surface of which an arithmetic mean roughness Ra with a reference length of 100 μm is from 1 nm to 1000 nm, wherein the particles in the dried film exist on the surface of the substrate in a state that a crystal direction is not oriented, and wherein the dried film exhibits hydrophilicity independently of light based on the particles in the dried film, and a contact angle with water of the dried film stored for a month in a dark place and tested without light irradiation is 10° or less.

12. The method according to claim 11,
wherein the coating material contains the inorganic binder, and
wherein the inorganic binder includes at least one selected from the group consisting of silica, colloidal silica, alumina, zirconia, zinc oxide, silicon compound, phosphate, water glass, glass frit, gypsum, and lime.

13. The method according to claim 11,
wherein a mean particle diameter of the particles is in a range of from 1 nm to 200 nm.

14. The method according to claim 11,
wherein a BET specific surface area of the particles is in a range of 4.1 $m^2/g$ to 820 $m^2/g$.

15. The method according to claim 11,
wherein the dried film is formed by drying the coating material at a temperature of 200° C. or less.

16. The method according to claim 11,
wherein the tungsten oxide composite includes a transition metal element in a range of from 0.001 mass % to 50 mass %.

17. The method according to claim 11,
wherein the crystal structure further includes rhombic crystal of tungsten trioxide.

18. The method according to claim 11, further comprising:
fabricating the particles by sublimating a metal tungsten powder, a tungsten compound powder, or a tungsten compound solution in an oxygen atmosphere.

19. The method according to claim 18,
wherein the metal tungsten powder, the tungsten compound powder, or the tungsten compound solution is sublimated by an inductively coupled plasma process in the oxygen atmosphere.

20. The method according to claim 18, further comprising:
heat-treating the particles obtained by sublimating at a temperature of 200° C. to 1000° C. for 10 minutes to 5 hours.

* * * * *